(12) United States Patent
Barber

(10) Patent No.: US 6,255,953 B1
(45) Date of Patent: Jul. 3, 2001

(54) TORNADO WARNING SYSTEM

(76) Inventor: Jerry Keith Barber, P.O. Box 1323, Willis, TX (US) 77378

( * ) Notice: Subject to any disclaimer, the term of this patent is extended or adjusted under 35 U.S.C. 154(b) by 0 days.

(21) Appl. No.: 09/332,915

(22) Filed: Jun. 14, 1999

(51) Int. Cl.[7] .................................................. G01W 1/00
(52) U.S. Cl. ........................ 340/601; 340/539; 340/628; 73/170.16; 73/384; 702/3
(58) Field of Search ..................... 340/539, 601, 340/602, 690, 628; 73/170.16, 384; 702/3

(56) References Cited

U.S. PATENT DOCUMENTS

| | | | |
|---|---|---|---|
| 3,603,951 | * 9/1971 | Bracken et al. | 340/601 |
| 3,753,117 | * 8/1973 | Downing et al. | 340/601 |
| 5,546,800 | * 8/1996 | Daniel | 340/602 |
| 5,781,852 | 7/1998 | Gropper | 455/227 |
| 5,910,763 | * 6/1999 | Flanagan | 340/690 |
| 6,018,699 | 1/2000 | Baron, Sr. et al. | 702/3 |
| 6,034,608 | * 3/2000 | Frank et al. | 340/601 |
| 6,125,328 | 9/2000 | Baron et al. | 702/3 |

* cited by examiner

Primary Examiner—Daniel J. Wu
(74) Attorney, Agent, or Firm—Bracewell & Patterson, L.L.P.

(57) ABSTRACT

A pager receiver based system provides a method and an apparatus for receiving and detecting a tornado alert from the National Weather Service, determining the region to which the alert applies, and broadcasting an alert signal to a plurality of pager receivers, all programmed with the same pager number, within that region.

13 Claims, 3 Drawing Sheets

US 6,255,953 B1

TORNADO WARNING SYSTEM

FIELD OF THE INVENTION

The present invention relates generally to the field of tornado warning systems and, more particularly, to a dedicated pager system for providing tornado alerts, as well as a method of providing a distributed warning signal on a county-by-county basis (or other geographically defined grid system) using a paging system.

BACKGROUND OF THE INVENTION

Tone activated alert receivers are well known and are regularly used by emergency agencies including fire, police, ambulance, and rescue services. The National Weather Service (NWS) transmits an alert signal to activate commonly available weather alert receivers to warn of impending severe and potentially life threatening weather such as tornadoes, thunderstorms, floods, and blizzards. Known receivers can be set to issue a siren, flash an LED, and/or announce the voice weather alert message in response to receiving and decoding an alert signal.

The NWS and emergency agencies broadcast a digital code as a header preceding each alert message. This digital header usually contains the type of warning, the effective time and expiration time of the warning and the areas effected. Although the type of the warning can be obtained through decoding the header, it has been found that most of the effected public doesn't feel a compelling need for all of the information contained in the alert message, or even all the information contained in just the header. What the public wants is an alert of an impending severe weather condition, such as a tornado, that is specifically directed to them, in sufficient time to take evasive action.

Such warnings are often extremely time critical. Warnings must automatically be received by the ultimate end user, preferably on a dedicated system that will not be interfered with by other communications channels.

U.S. Pat. No. 5,681,852 to Gropper describes a capable system which provides an alert receiver interface. The receiver automatically detects the issuance of an emergency message broadcast on a radio channel, or on another communication system. The system records that alert message into the receiver with an audible day and time stamp for later playback. The system also provides an interface between the alert receiver and other communications systems, including paging system, whereby an alert message, or an alarm tone, is automatically relayed and repeated on the other communication system. The system also teaches selectively activating another communication system for only those alert messages of specific concern to users of the other communications system. In that mode, the alert receiver interface can be set by a user for specific needs such as to detect a fire company's alert signal on a public service radio channel and then go through the recording, day, and time stamp and playback sequences.

While the system described in the '852 is a very capable system, recent tragedies, such as that in Oklahoma City, indicate that a broadly available alert warning system is still badly needed. Such a system should be dedicated to a specific need, without the requirement of being selected by a user. Further, the system should eliminate the mystery of the known complex systems, and be readily acceptable in the market.

Sales figures show that consumers today readily accept pagers and smoke detectors. Consequently, an alert warning system preferably should extend the already widely accepted pager and smoke detector systems to provide an audible early warning of a tornado.

SUMMARY OF THE INVENTION

This invention teaches a method and apparatus for receiving and detecting a tornado alert from the National Weather Service, determining the region to which the alert applies, and broadcasting an alert signal to a plurality of pager receivers, all with the same pager number, within that region. Weather alerts are commonly issued today on a county-by-county basis, and it is anticipated that advancing technology will soon permit the NWS to issue such alerts that are broken down into an even smaller area than a county. The present invention anticipates such advancements within the scope of the present invention.

An object of the present invention is to create a dedicated, simple, and reliable tornado alert system. The system is preferably housed within the same enclosure as a common smoke detector, or in an enclosure that mimics but is distinguishable from a common smoke detector.

In the system of the present invention, a monitoring station continuously monitors broadcasts from the National Weather Service. All but tornado alerts are eliminated, so that the system only selects tornado alerts which are broadcast. The system next determines the region to which the alert applies, generally today specifying one or more counties. For each county (or other smaller region), the system broadcasts one, predetermined pager number, one pager number per region. Within the region are installed a plurality of pager receivers, each pager receiver installed within its own previously described enclosure. Thus, the tornado alert may be received by thousands of pager receivers, each assigned the same pager number, and all within the specified geographic area. That way, if a pager receiver installed within the system of this invention receives a number directed to it, the receiver is within the region to which the tornado alert applies. The pager receiver then activates a distinctive audible alert which is readily distinguishable from a smoke alarm.

The system of this invention is adapted to use well know pager receivers, but is modified to emit an alarm that is distinguishable from other alarms, such as smoke alarms, and is further modified to emit an alarm that is loud enough to awaken a soundly sleeping person.

These and other features and objects of this invention will be apparent to those skilled in the art from a review of the following detailed description and the accompanying drawings.

DESCRIPTION OF THE PREFERRED EMBODIMENTS

Figure 1:
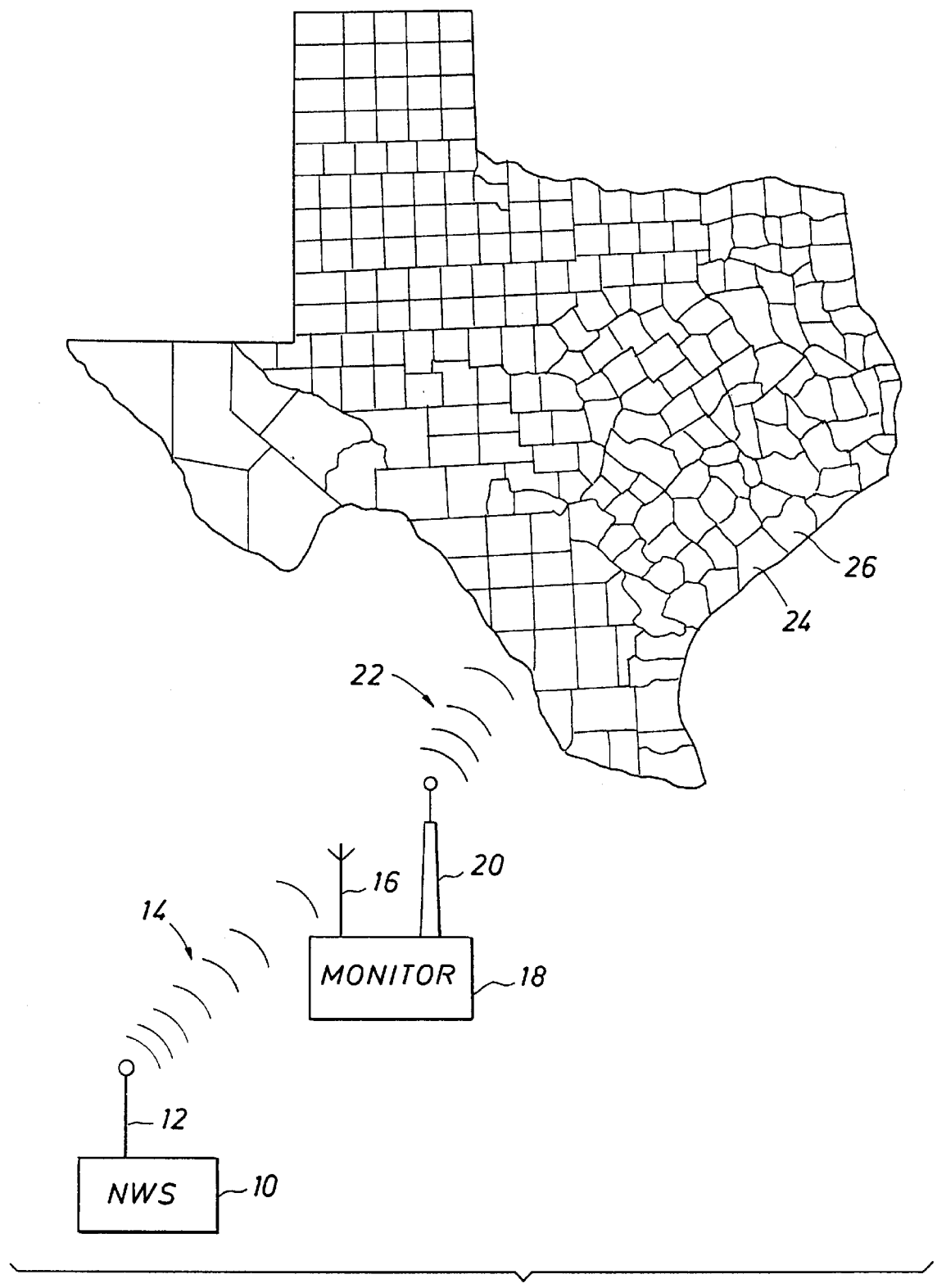
FIG. 1 is a stylized schematic of an overall system of this invention.

FIG. 1 depicts a schematic of the tornado alert system of this invention. As previously described, the National Weather Service (NWS) 10 constantly monitors weather conditions and, in the event of a detection or a report of a tornado being sighted, or other dangerous weather condition, issues an alert. The alert may contain a great deal of information of interest, but the only information pertinent to the present invention is that the condition is a tornado reported to have touched down and its location.

The alert is transmitted from the NWS 10 via an antenna 12 as a broadcast signal 14. The broadcast signal 14 is received by an antenna 16, located at a central monitor 18, a feature of the present invention. The monitor includes a number of features, shown in more detail in FIG. 3. The monitor filters out all broadcast signals from the NWS except for those indicating a tornado. From the tornado alert, the monitor determines the location of the tornado. Generally, the tornado alert indicates what county the tornado has been spotted in. The particular county determines which of a set of pager receivers (FIG. 3) are to receive a pager alert signal.

The monitor 18 develops the pager alert signal, and transmits this pager alert signal via an antenna 20, which may be a conventional pager antenna. The antenna 20 transmits the pager alert signal as a signal 22, which is received in all of the pager receivers in the appropriate county which are enabled with the present invention, shown in FIG. 1 as county 24 or 26. It should be understood that the signal from the antenna 20 may be directed to a satellite in the conventional manner, so that the invention potentially covers the entire world.

It should also be recognized that all of the pager receivers enabled with the present invention in one particular county are programmed with the same pager number, which is different than any other county. Thus, when a pager receiver in the system is activated, the user knows for a certainty that a tornado has been reported or sighted in the county where the user is.

Figure 2:
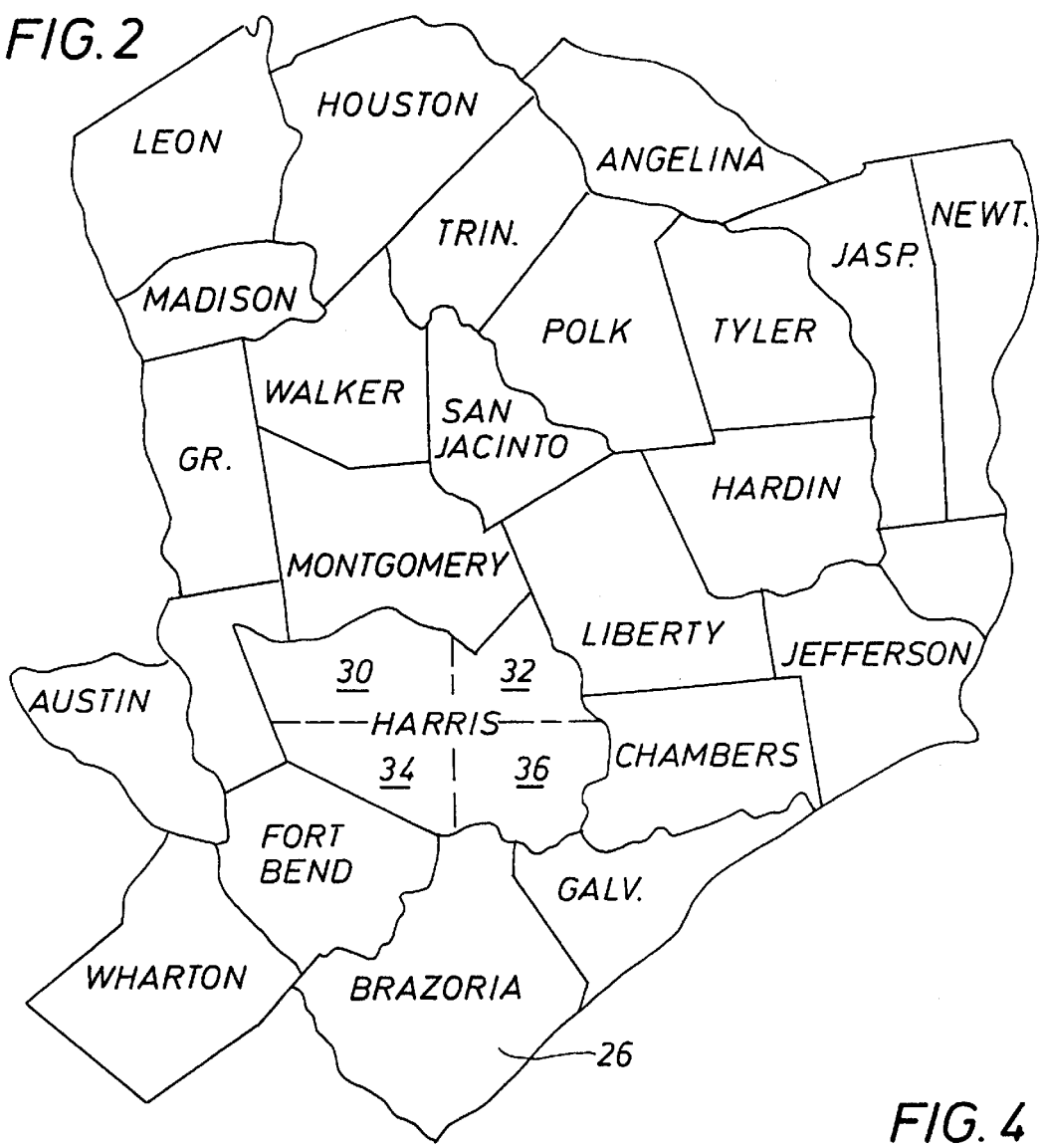
FIG. 2 is a map showing county boundaries of certain counties in Texas.

FIG. 2 is a smaller scale map of a section of Texas. This drawing figure indicates that, if the NWS can pinpoint a tornado to a grid section which is only a portion of a county, such as one of portions 30, 32, 34, or 36, the present invention can accommodate that advancement in technology. Thus, if a user knows that he is in section 34, and his pager tornado alert system is activated, he knows that the tornado is within the region within the boundaries of portion 34.

Figure 3:
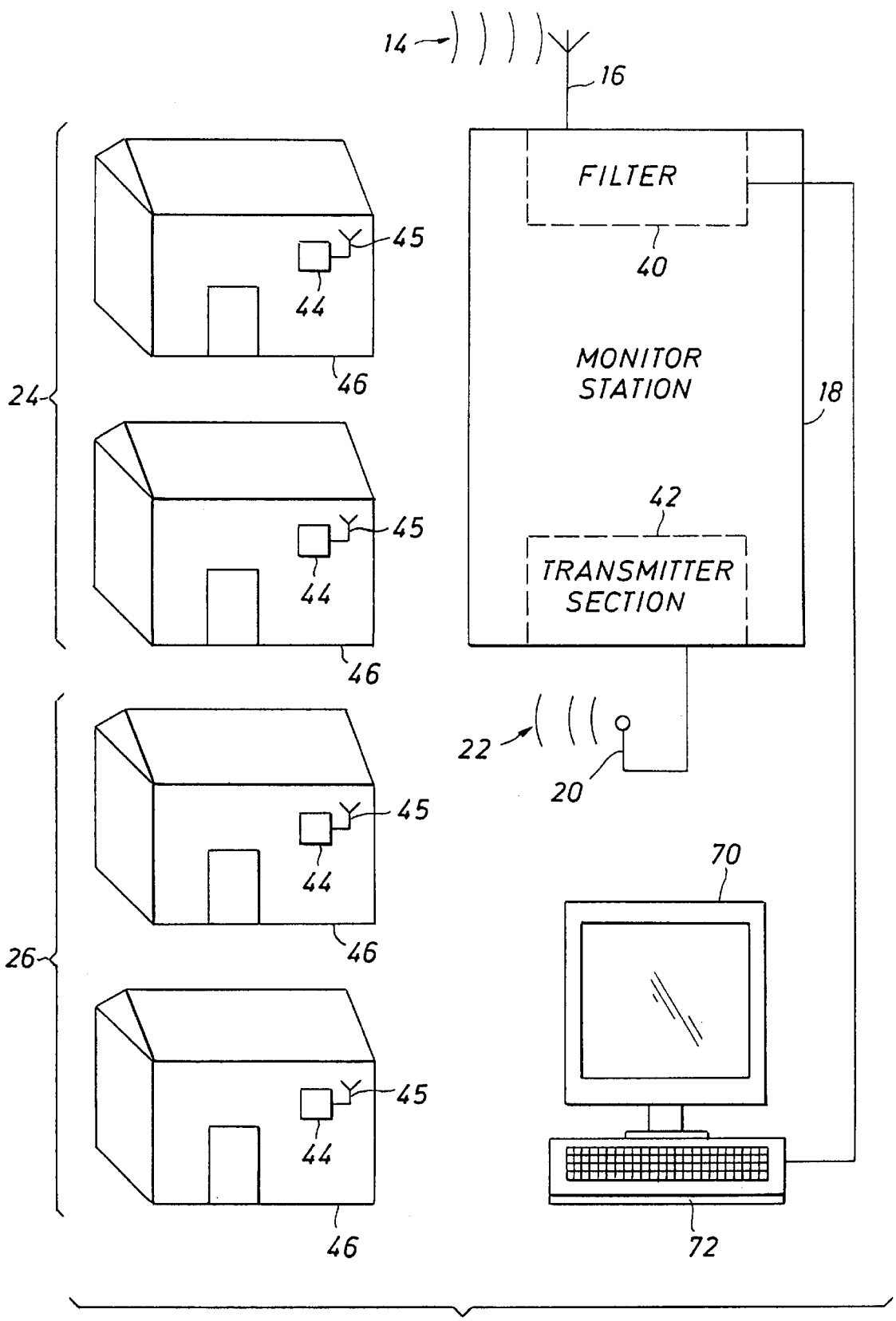
FIG. 3 is a block diagram of the tornado alert system of the present invention.

FIG. 3 shows additional details of the invention. As previously described, the monitor station 18 receives a signal 14 at an antenna 16. The received signal may comprise a flood warning, a fire alert, a tornado alert, or other disaster warning. The monitor station 18 receives all of these signals, but it includes a filter 40 to ignore all signals but those indicating a tornado warning.

Alternatively, this portion of the invention may involve a human operator who continuously monitors the NWS and other broadcasts. The monitoring takes place at a workstation 70, which includes a CPU 72. An operator screens all of the announcements from the NWS or other weather reporting service and passes on only the tornado warning signals.

The received signal 14 also includes a geographic indication of the location of the announced tornado. This information is packaged in the monitor station 18 in a transmitter section 42 as a simple pager signal. The pager signal is then transmitted by the antenna 20.

Each of the users equipped with this invention includes an installed pager receiver 44, each having an antenna 45. The pager receiver 44 is mounted within a structure 46, which may be a residence, an office building, a church, or other building. Some of the structures 46 are located in county 24, and some are located in county 26. Those within county 24 are all programmed with the same pager number. Those within county 26 are all programmed with the same pager number, but that pager number is different than those within county 24.

Figure 4:
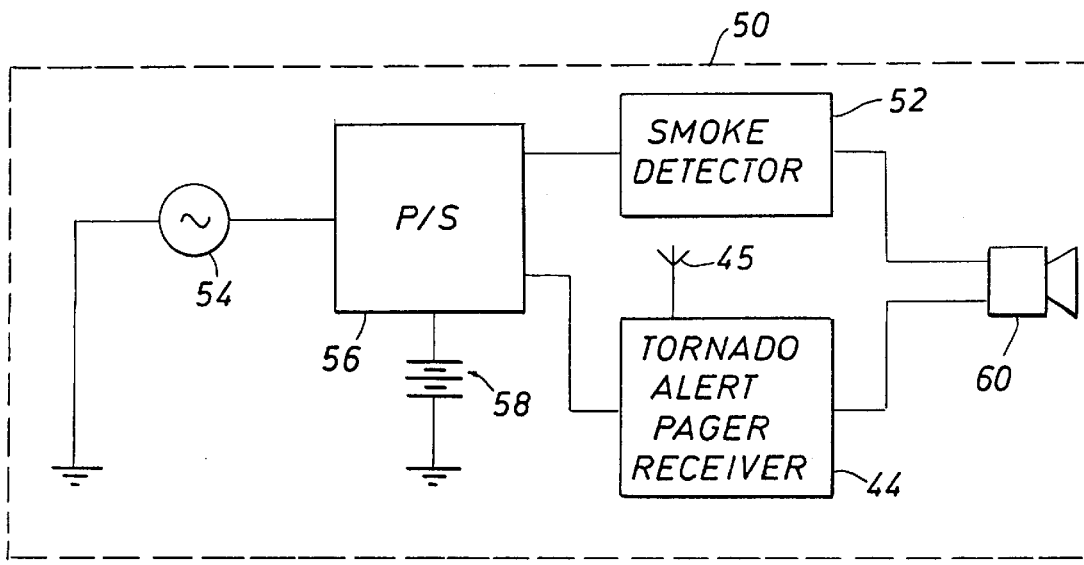
FIG. 4 is a block diagram of a combination smoke alarm and tornado alert.

FIG. 4 depicts a block diagram of a combination unit 50. The combination unit 50 includes a smoke detector 52 and the pager receiver 44. The combination unit is preferably powered from a standard 110V AC line current 54 which provides power to a power supply 56. The power supply 56 is preferably provided with a battery backup 58. The power supply 56 powers each of the smoke detector 52 and the pager receiver 44. In one sense, the smoke detector 52 is a "local" sensor, in that it is activated by a phenomenon within the structure 46, and the pager receiver 44 is a "remote" sensor, in that it is activated by a phenomenon outside the home. The system is easily adapted to other phenomena of interest, such as an intruder alert from the structure, and other phenomena from outside the structure to activate the combination unit.

Upon activation, either the smoke detector 52 or the pager receiver 44 generates an audible signal and the audible signal from the smoke detector is easily distinguishable from the audible signal of the pager receiver. Each should be loud enough to wake up a soundly sleeping person. The smoke detector 52 and the pager receiver 44 share a common speaker or enunciator 60 for this purpose.

In the preferred system arrangement, each user subscribes to the system for the service. The receiver 44 is installed in the structure, whether it is a home or other building, and the receiver 44 is provided with or without charge. In return the user pays a subscription fee with a minimum subscription term. This way, the user has a reliable, inexpensive tornado alert system, and the service provider can gauge the service fee to assure a profit.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A tornado warning system comprising:
   a. a monitor station to monitor broadcasts from a weather warning source;
   b. an electronically programmable filter in the monitor station to select only a tornado warning from the broadcasts, and once programmed, the filter developing an alert pager signal from the tornado warnings without human intervention, the alert pager signal applicable to a selected geographical region;
   c. a transmitter to transmit the alert pager signal; and
   d. a plurality of pager receivers within the selected geographical region, each of the plurality of pager receivers having the same pager number to receive the alert pager signal.

2. The system of claim 1, wherein each of the plurality of pager receivers is fixed to a structure in the geographical region.

3. The system of claim 2, wherein at least one of the page receivers is combined with a smoke detector in at least one of the structures in the geographical region.

4. The system of claim 3, wherein the smoke detector and the pager receiver within the at least one of the structures is powered from the same power source.

5. The system of claim 3, wherein the smoke detector and the pager receiver within the at least one of the structures share a common enunciator, and an alarm signal from the smoke detector is distinguishable from an alarm signal from the pager receiver.

6. The system of claim 1, wherein the selected geographical region is a county.

7. The system of claim 1, wherein the selected geographical region is a portion of a county.

8. A method of tornado alert, comprising the steps of:
   a. installing a plurality of pager receivers in a predetermined geographical region, all pager receivers within a particular identifiable region being programmed with the same pager number which is different than the pager number of pager receivers in any other identifiable region;
   b. receiving broadcasts from a weather warning source;
   c. programming an electronically programmable filter to select from the received broadcasts only a tornado warning;
   d. selecting by the filter from the received broadcasts only a tornado warning without human intervention;
   e. determining the region of applicability of the tornado warning;
   f. selecting a pager number for the determined region;
   g. broadcasting the pager number to the pager receivers programmed with the selected pager number;
   h. receiving the broadcast pager number in at least one of the plurality of pager receivers; and
   i. activating an audible tornado alert.

9. The method of claim 8, wherein the predetermined geographical region is a county.

10. The method of claim 8, wherein the predetermined geographical region is a portion of county.

11. The method of claim 8, wherein at least one of the plurality of pager receivers is combined with a smoke detector in a common enclosure.

12. A tornado warning system comprising:
   a. a monitor station to monitor broadcasts from a weather warning source;
   b. an electronically programmable filter in the monitoring station to select only a tornado warning from the broadcasts, the filter including a workstation operated by an operator, and once programmed, the filter developing an alert pager signal from the tornado warnings without human intervention, the alert pager signal applicable to a selected geographical region;
   c. a transmitter to transmit the alert pager signal; and
   d. a plurality of pager receivers within the selected geographical region, each of the plurality of pager receivers having the same pager number to receive the alert pager signal.

13. A warning system comprising:
   a. a monitor station to monitor broadcasts from a weather warning source;
   b. an electronically programmable filter in the monitor station to select only a predetermined type of warning from a plurality of types of warnings from the broadcasts, and once programmed, the filter developing an alert pager signal from the predetermined type of warning without human intervention, the alert pager signal applicable to a selected geographical region;
   c. a transmitter to transmit the alert pager signal; and
   d. a plurality of pager receivers within the selected geographical region, each of the plurality of pager receivers having the same pager number to receive the alert pager signal.

\* \* \* \* \*